United States Patent
Mononen

(10) Patent No.: US 7,050,403 B2
(45) Date of Patent: May 23, 2006

(54) PACKET LENGTH CLASSIFICATION

(75) Inventor: Risto Mononen, Espoo (FI)

(73) Assignee: Nokia Corporation, Espoo (FI)

(*) Notice: Subject to any disclaimer, the term of this patent is extended or adjusted under 35 U.S.C. 154(b) by 858 days.

(21) Appl. No.: 09/970,754

(22) Filed: Oct. 3, 2001

(65) Prior Publication Data

US 2002/0114327 A1 Aug. 22, 2002

Related U.S. Application Data

(63) Continuation of application No. PCT/EP99/02783, filed on Apr. 12, 1999.

(51) Int. Cl.
*H04J 1/16* (2006.01)

(52) U.S. Cl. .................. 370/252; 370/352; 370/401
(58) Field of Classification Search ............... 370/252, 370/352–356, 400, 401, 471, 389
See application file for complete search history.

(56) References Cited

U.S. PATENT DOCUMENTS

| 5,414,650 | A | * | 5/1995 | Hekhuis ................. 708/203 |
| 5,764,645 | A | | 6/1998 | Bernet et al. ............. 370/466 |
| 6,292,917 | B1 | * | 9/2001 | Sinha et al. ............. 714/752 |
| 2002/0143939 | A1 | * | 10/2002 | Riddle et al. ............ 709/224 |
| 2002/0181484 | A1 | * | 12/2002 | Aimoto .................. 370/413 |

FOREIGN PATENT DOCUMENTS

| JP | 63287231 | 11/1988 |
| WO | WO 95/12265 | 5/1995 |

OTHER PUBLICATIONS

International Search Report for PCT/EP99/02783.
Nichols et al., "Format for Diffserv Working Group Traffic Conditioner Drafts", Internet Draft, Internet Engineering Task Force, Differentiated Services Working Group,, Feb. 1999, pages 1–3.

Bernet et al, "Interoperation of RSVP/Int–Serv and Diff–Serv Networks", Feb. 26, 1999, Internet Draft, File: draft–ietf–diffserv–rsvp–02.ps, pages 1–22.

Jacobson et al, "An Expedited Forwaarding PHB", <draft–ietf–diffserv–phb–ef–02.txt>, Feb. 1999, Internet Draft, Internet Engineering Task Force, Differentiated Services Working Group, pages 1–8.

Bernet et al, "A Framework for Differentiated Services", <draft–ietf–diffserv–framework–02.txt>, Feb. 1999, Internet Draft, Differemtiated Services, pages 1–37.

Heinanen et al, "Assured Forwarding PHB Group", <draft–ietf–diffserv–af–02.txt>, Internet Draft, Internet Engineering Task Force, Pages 1–8.

Nichols et al, "Definition of the Differentiated Services Field (DS Field) in the IPv6 Headers", Internet Working Group, Dec. 1998, pages 1–20.

Blake et al, "An Architecture for Differentiated Services", Network Working Group, Dec. 1998, pages 1–36.

* cited by examiner

*Primary Examiner*—John Pezzlo
(74) *Attorney, Agent, or Firm*—Squire, Sanders & Dempsey LLP

(57) ABSTRACT

The present invention discloses a method for classifying packets in a packet network. The method comprises the steps of detecting (S1) the length of a packet and classifying (S2, S3, S4) the packets depending on the detected length. By this method, it is possible to easily determine the different classes of packets by referring to the length of a packet. Hence, no special control data fields have to be generated and added to the packets in order to provide them with different transmission qualities in dependence on their class or type. Furthermore, the present invention also discloses a routing device adapted to carry out the method.

11 Claims, 7 Drawing Sheets

PACKET LENGTH CLASSIFICATION

This application is a continuation of international application serial number PCT/EP99/02783, filed 12 Apr. 1999.

FIELD OF THE INVENTION

The invention relates to a method for classifying packets in a packet network. Particularly the present invention relates to such a method which enables a different processing of the packets depending on the different kinds or classes of packets transported in this network.

BACKGROUND OF THE INVENTION

Generally, in such networks so-called Quality of Service (QoS) has to be supported for certain packets (in the following simply referred to as packets) transported in a packet data network (in the following referred to as packet network).

The term Quality of Service (QoS) relates especially to the quality of transmission of the packets. For example, in case that speech signals are transmitted in form of packet (as in GSM, for example), it is necessary that these packets are processed in real-time. Therefore, these packets require a fast transmission without delay. On the other hand, there are packets which do not require a real-time processing, for example in a computer network without real-time applications or in GPRS (General Packet Radio Service).

This is especially important in the field of internet telephony (IP telephony) since in such a network a lot of packets are transported which do not require a real-time processing since they comprise text data, for example. These packets can be transported with a certain delay, since a delay usually does not affect the transmission quality of such data. In contrast thereto, if speech signals transported in packets would be transported with a certain delay, the quality of transmission would be remarkably reduced. Therefore, a certain quality has to be secured for the transmission of a packet network.

Currently, there exist two main approaches for providing Quality of Service in IP networks. The first approach is called Integrated Services. According to this approach, IP packets are flowing inside flows for which well defined, i.e., guaranteed resources are allocated.

The second approach is called Differentiated Services (DiffServ) and it is based on the idea that packets are indicated as needing different kind of processing inside the network. That is, the packets are classified. Hence, in contrast to Integrated Services, Differentiated Services give relative guarantees.

Thus, routers in a network which support Differentiated Services have to distinguish between different classes of packets in order to forward them in the way as required. Therefore, in Differentiated Services each packet has a special control data field (a so-called DS field or Differentiated Services field) comprising IP TOS bits (IP type of service bits). In this field, the kind of processing needed by the corresponding packet is indicated by a certain value. That is, the IP TOS bits define the so-called "per-hop behaviour" (PHB) of the packet.

FIG. 7 shows the basic structure of such a packet. As illustrated, the packet comprises the IP header in which the DS field including the IP TOS bits is arranged and a packet body including the data to be transmitted in this packet.

When a packet which does not comprise the above mentioned DS field enters a network which supports Differentiated Services, such a field has to be included in the packet. For example, packets transmitted via a GSM network (real-time packets) have to be indicated as needing a real-time processing. This addition is performed by so-called edge routers. Thus, the edge routers represent a kind of interface between the packet network supporting Differentiated Services and other packet networks.

An example of such a network is schematically illustrated in FIG. 1. A network NW comprises core routers R11, R12 and R13 which transmit packets only within the packet network NW. The network NW supports Differentiated Services. That is, each of the core routers is able to read the IP TOS bits and to treat each respective packet correspondingly.

Furthermore, edge routers ER1 and ER2 are provided. The edge router ER1 connects the network NW to a telephone network TN in which only speech signals are transmitted. The telephone network TN could be a GSM network, for example, in which packets (speech) require a real-time processing. On the other hand, the edge router ER2 connects the network NW to a computer network CN in which only packets are transmitted which do not require a real-time processing.

By the edge routers ER1 and ER2 it has to be determined which kind of service for the packets entering the network NW from the respective network CN or TN has to be provided. In the above example, the telephone network is a GSM network. Hence, the service required for packets entering from the telephone network TN has to be a real-time processing. Thus, the packets have to be indicated accordingly. While the packets are transmitted through the network NW, the routers R11, R12 and R13 have to check the IP TOS bits of the packets in order to adequately treat the packets and to transmit them accordingly. It should be noted that in order to simplify the illustration, further connections to the outside of network NW are only indicated by arrows. This connections could be connected to further networks, computer terminals or telephones etc.

Thus, the above method using the Differentiated Services has the drawback that a special control data field comprising the IP TOS bits has to be included in each packet. Therefore, the processing load in the network is increased. Furthermore, edge routers are necessary. Thus, additional hardware and software has to be provided. Moreover, in order to classify the packets, the control data field has to be investigated by the routers, which causes a complicated handling of the packets leading to a further delay of transmission.

In addition, in several routers according to the prior art it is not only referred to the DS field of a packet in order to classify this packet, but also to other information included in the packet. For example, this can be a protocol field, source and/or destination number, source and/or destination IP address, device interface etc. At least some of this information is not accessible in case the data of the packet is encrypted. This is for example the case in legacy IP devices.

SUMMARY OF THE INVENTION

Therefore, the object underlying the present invention is to provide a method for classifying packets in a packet network in which the above drawbacks of the prior art are removed, as well as to provide an accordingly adapted device.

In detail, according to the present invention a method for classifying packets in a packet network is provided, the method comprising the steps of detecting the length of a packet and classifying the packets depending on the detected length.

Furthermore, according to the present invention a routing device for forwarding packets in a packet network is provided, the routing device comprising a detecting means for detecting the length of a packet, and a classifying means for classifying the packet depending on the detected length.

Advantageous further developments are defined in the respective dependent claims.

By this method and routing device, it is possible to easily determine the different classes of packets by referring to the length of a packet. Furthermore, no special control data fields comprising the IP TOS bits have to be included into each packet. That is, the bits which were necessary for the IP TOS bits in the prior art can be used for other data. Moreover, no additional hardware and software are required, and no special data fields have to be investigated by the routers. Therefore, the packets can be forwarded faster.

BRIEF DESCRIPTION OF THE DRAWINGS

The present invention will be more readily understood with reference to the accompanying drawings in which.

DETAILED DESCRIPTION OF PREFERRED EMBODIMENTS

In the following, embodiments of the invention are described in more detail with reference to the accompanying drawings.

Figure 1:
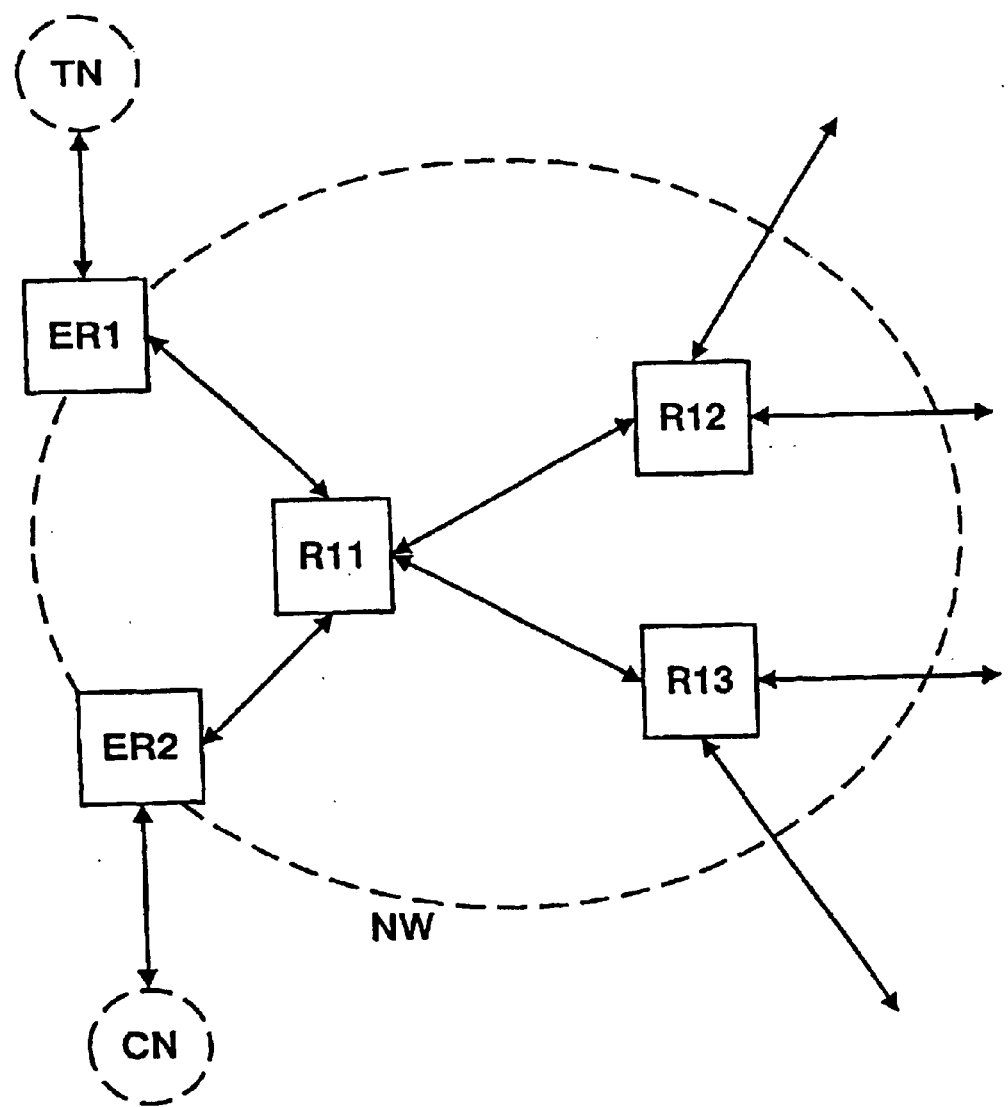
FIG. 1 shows a simplified diagram of a packet network including edge routers according to the prior art.
Figure 2:
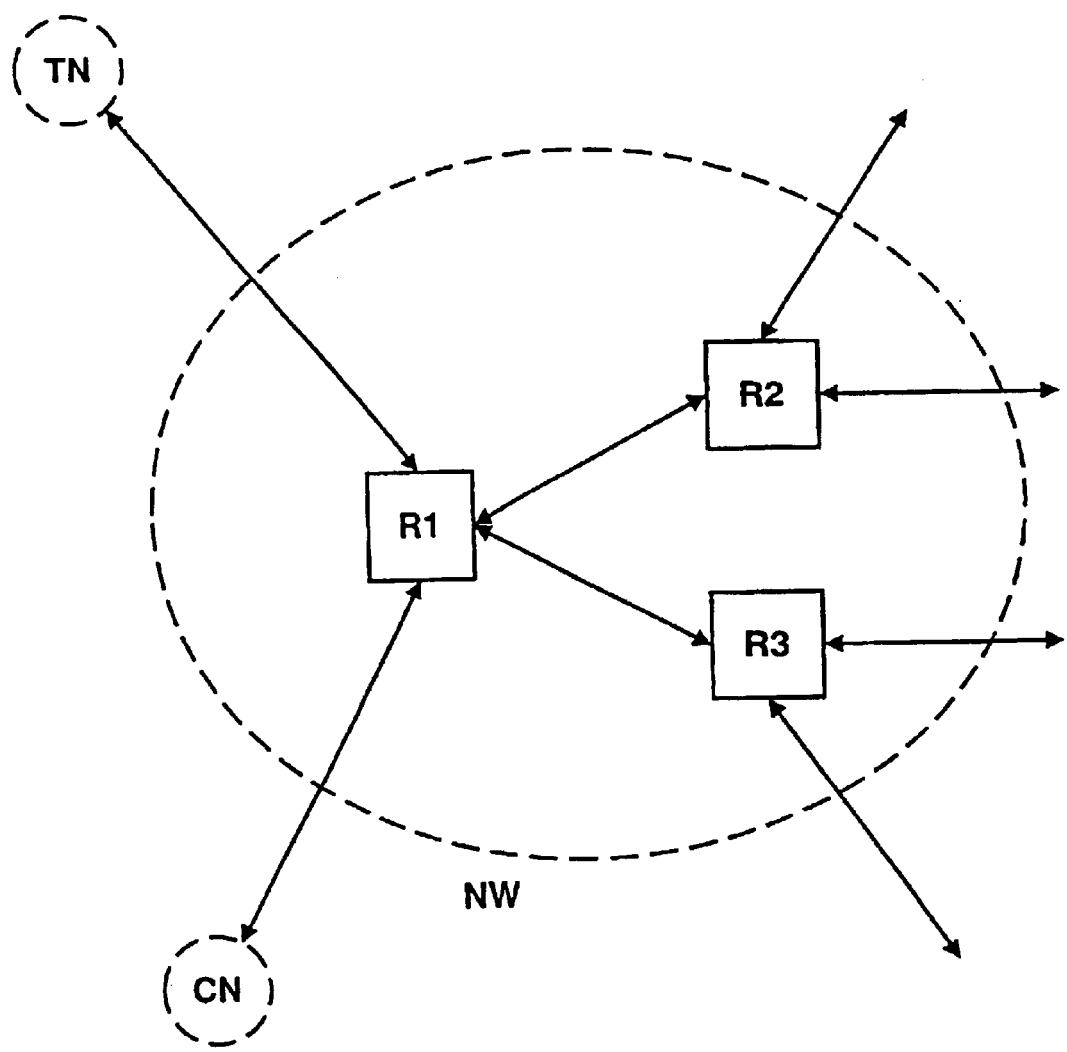
FIG. 2 shows a simplified diagram of a packet network according to a first embodiment.

FIG. 2 shows a simplified diagram of a packet network NW to which a telephone network TN and a computer network CN are connected. The telephone network TN and the computer network CN are similar to those shown in FIG. 1. The network NW comprises routers R1, R2 and R3. These routers serve to forward packets to other routers or to destinations not shown, for example to other networks, computer terminals or telephones.

The main difference between the network shown in FIG. 1 and the network shown in FIG. 2 is that the edge routers ER1 and ER2 are omitted. Namely, the routers R1, R2 and R3 within the network NW employ a method due to which the functionality of the edge routers is dispensable, as will be described in the following.

In detail, the method employed by the routers for classifying packets does not need a special control data field within each packet as in the prior art. In contrast thereto, the method according to the first embodiment simply uses the length of a packet as a distinguishing criterion.

Namely, typically speech codecs produce packets with a length of a few tens of octets, while normal packets are usually longer. That is, the length of a packet of a speech application requiring a real-time processing (like GSM or UMTS) is relatively short. In the following, such a packet will be referred to as a "speech packet". On the other hand, the length of a packet of a network which packet does not require a real-time processing (like GPRS or a computer network) is relatively long. In the following, such a packet will be referred to as a "non-speech packet".

Hence, if a short packet occurs, it can be assumed that this packet is a speech packet and requires a real-time processing, that is, has to be transmitted as fast as possible. On the other hand, if a long packet occurs, it can be assumed that this is a non-speech packet which can be forwarded with a certain delay since it does not require a real-time processing.

Figure 7:
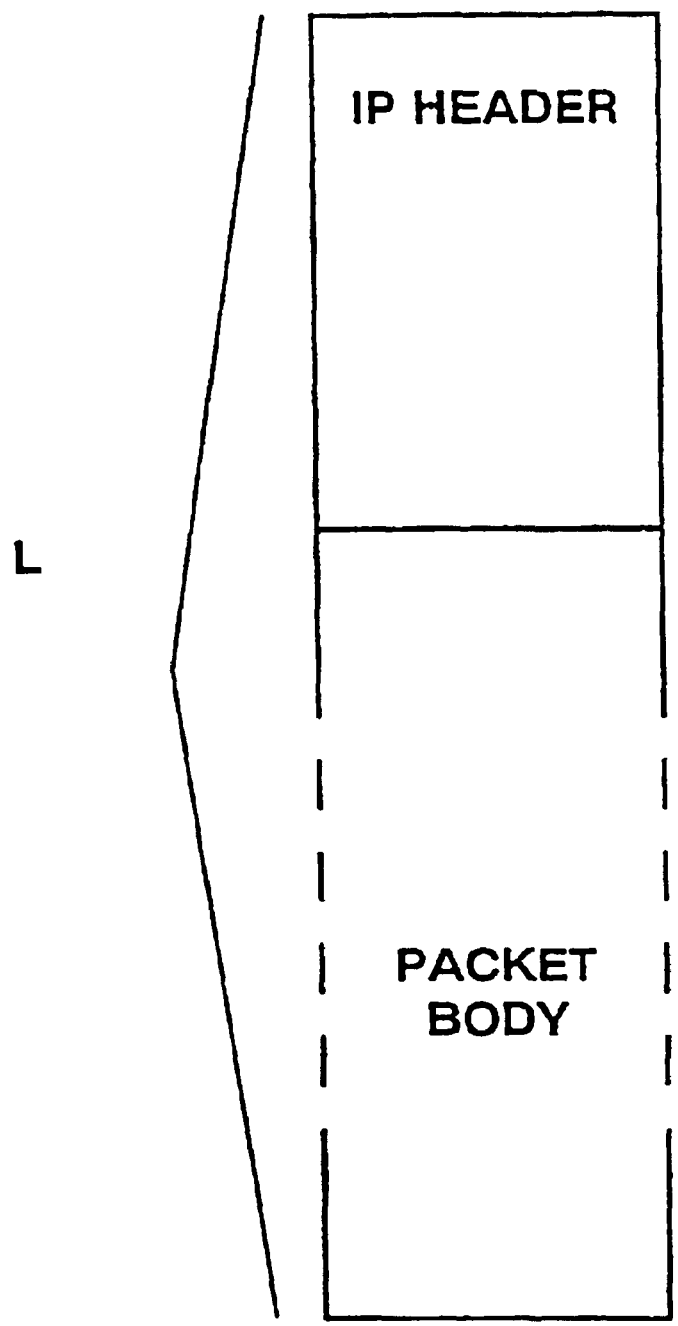
FIG. 7 shows the construction of packet.

A packet as used according to the present invention is shown in FIG. 7. Thus, the packet comprises the IP header and the packet body. The length L of the packet is part of the IP header information.

Figure 3:
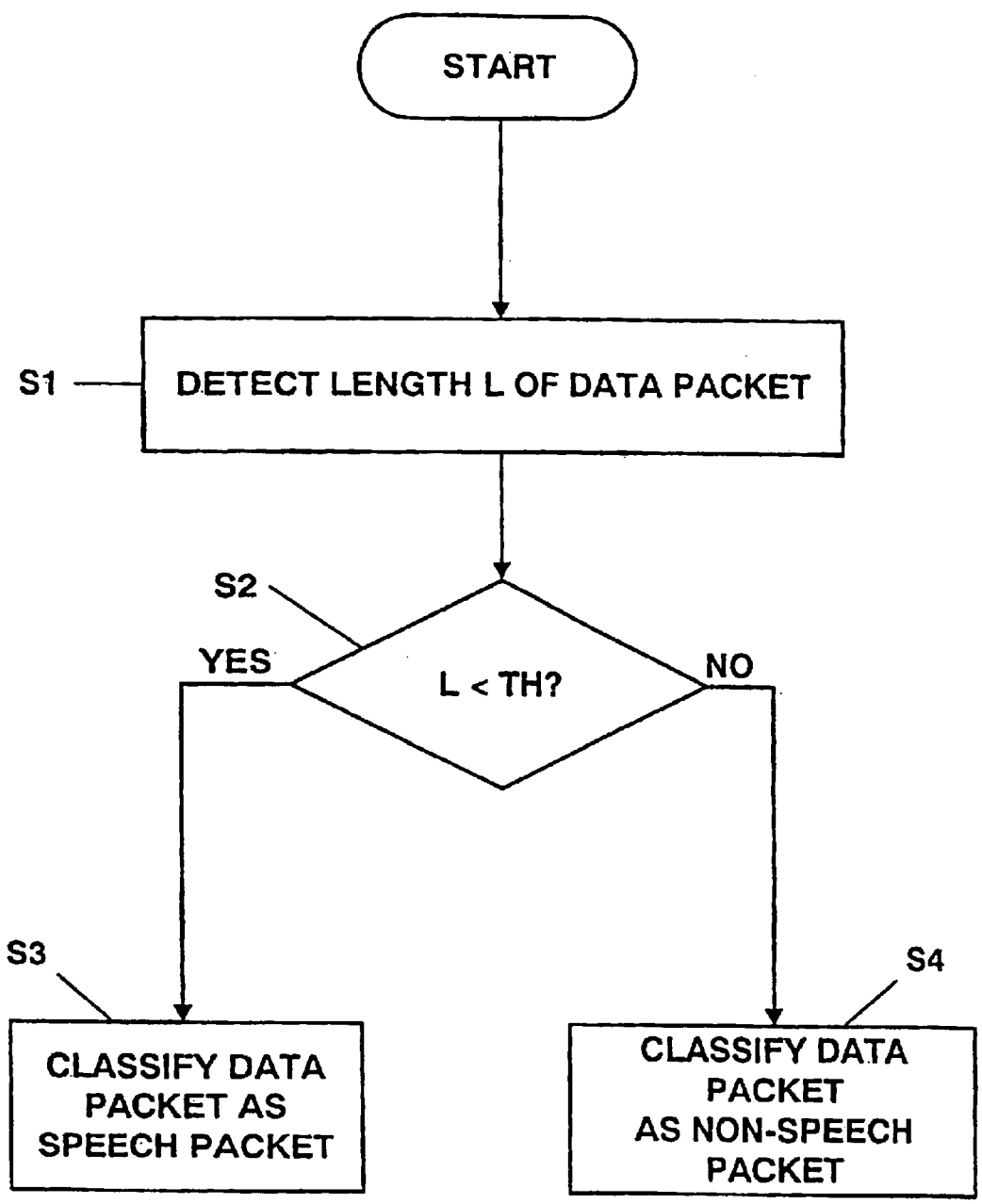
FIG. 3 shows a flowchart of a process carried out by a router of the packet network according to a first embodiment.

The process for classifying the packets carried out by the routers of the packet network NW is shown in the flowchart of FIG. 3.

In step S1, the length L of a packet is detected by reading the IP header of the packet. Then, in step S2, the length L is compared with a threshold TH. This threshold has to be set in accordance with the kind traffic of the packet network. That is, the threshold should be set on a value by which it is ensured that the length of all speech packets are below this threshold. For example, regarding packets transmitted from a GSM network, this threshold can be set to 60 octets.

If the length L of the packet is below this threshold TH, the packet is classified as a speech packet in step S3.

Hence, this packet is provided with the highest priority. That is, it is determined that this packet requires a real-time processing and has to be forwarded as fast as possible. Hence, each router can provide a shorter queuing time for this packet.

On the other hand, if it is determined in step S2 that the length L is above the threshold, the packet is classified as a non-speech packet in step S4. Hence, this packet is provided with the lowest priority. That is, it is determined that this packet does not require a real time processing and can therefore be forwarded with a certain delay, if necessary.

Thus, by this method it is possible to easily classify packets into those which require a real-time processing and those which do not need a real-time processing. Since this method uses the length of a packet as a distinguishing criterion, the function of the edge router as in the prior art is dispensable. Furthermore, the data field (DS field) comprising the IP TOS bits is not necessary and can be omitted. Therefore, the amount of data to be processed is reduced.

Furthermore, the length of a packet is a standard feature which is included in the IP header. Usually, already the sending IP host computer includes the length information into the IP header. Moreover, the packet length is also visible from data link information. Therefore, according to the first embodiment no additional processing for preparing the packets on entering the packet network NW is required.

Hence, a router in which the method according to this embodiment is carried out can easily be constructed since a means for searching the control data field and reading the control data, i.e. the IP TOS bits, can be omitted.

It is to be noted that according to the first embodiment an example has been described in which only speech packets and non-speech packets are distinguished. However, it is also possible to distinguish other kind of packets which require different processing in the routers (the so-called per-hop behaviour), as long as they can be distinguished using the length of the respective packet. In these cases, it is also possible to distinguish between more than only two classes of packets. Then, a plurality of thresholds have to be set.

According to the first embodiment it is assumed that the nature of the traffic going through a router is well known. This can be assumed in a network of the so-called third generation, wherein a part the traffic thereof runs also over the IP network. The traffic thereof comprises only two kinds of traffic: speech packets (like GSM) and normal packets (like GPRS). In this case, the nature of traffic is known and the kind of packets can be distinguished by referring to the length as a distinguishing criterion.

However, in case that the length of packets of different kinds are similar to each other, it can be difficult to distinguish the kind of packets only using the length. This problem can be solved by treating such packets (i.e., which have a similar length and are of a different kind) in a special way.

Figure 4:
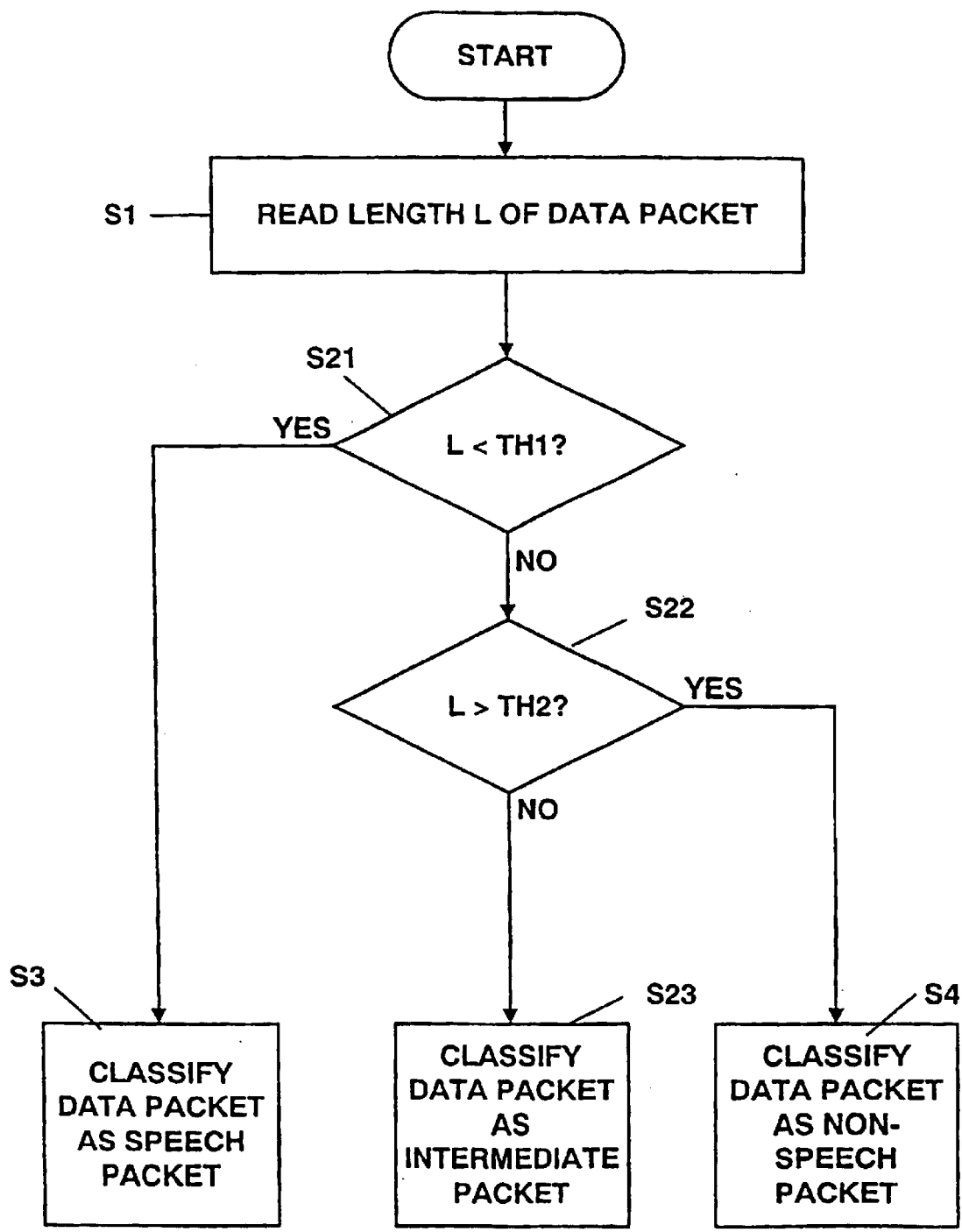
FIG. 4 shows a flowchart of a method carried out by a router of a packet network according to a second embodiment.

The above method is described as a second embodiment of the invention with respect to a flowchart shown in FIG. 4.

For this process, the threshold TH according to the first embodiment is not a single value but a region of values limited by two thresholds TH1 and TH2. As above, a packet the length L of which is shorter than the lower threshold TH1 is classified as being a speech packet (steps S21 and S3). Hence, such a packet is provided with the highest priority. A packet the length L of which is longer than the upper threshold TH2 is determined as being a non-speech packet (steps S22 and S4). Thus, such a packet is provided with the lowest priority.

A packet the length L of which is between the lower threshold TH1 and the upper threshold TH2 cannot be clearly distinguished. Therefore, such a packet (in the following referred to as an intermediate packet) is provided with an intermediate priority in step S23. That is, such a packet is classified into an intermediate class.

In the following processing, i.e., forwarding the respective packet, this intermediate priority can be taken into account. That is, the intermediate packet has a higher priority than a non-speech packet and will be forwarded faster than the non-speech packet. Hence, the transmission quality of a packet comprising speech and being classified as an intermediate packet is not affected to an extent as if it was classified as a non-speech packet. Furthermore, the intermediate packets can be forwarded as fast as speech packets during time periods in which the respective router has a sufficient capacity.

In the following, a further alternative for handling such intermediate packets is described as a third embodiment of the invention with reference to FIG. 5.

Namely, the present invention can be combined with the classifying of packets described in the introductory part. That is, the packets comprise a control data field (DS field) including the IP TOS bits (IP type of service bits). Hence, according to the second embodiment, the function of the edge routers can be maintained. However, this functions needs only to be activated in case that a packet entering the network NW is classified as an intermediate packet as described in the second embodiment. That is, the respective edge router has only to include the control data field including the IP TOS bits in intermediate packets and not in packets which are classified (by referring to the length L of the packet) as speech or non-speech packets. This reduces the processing load to a certain extent, since the edge router function is not always performed. It has to be noted that it is also possible to include the data field comprising the IP TOS bits already in the respective host computer.

Figure 5:
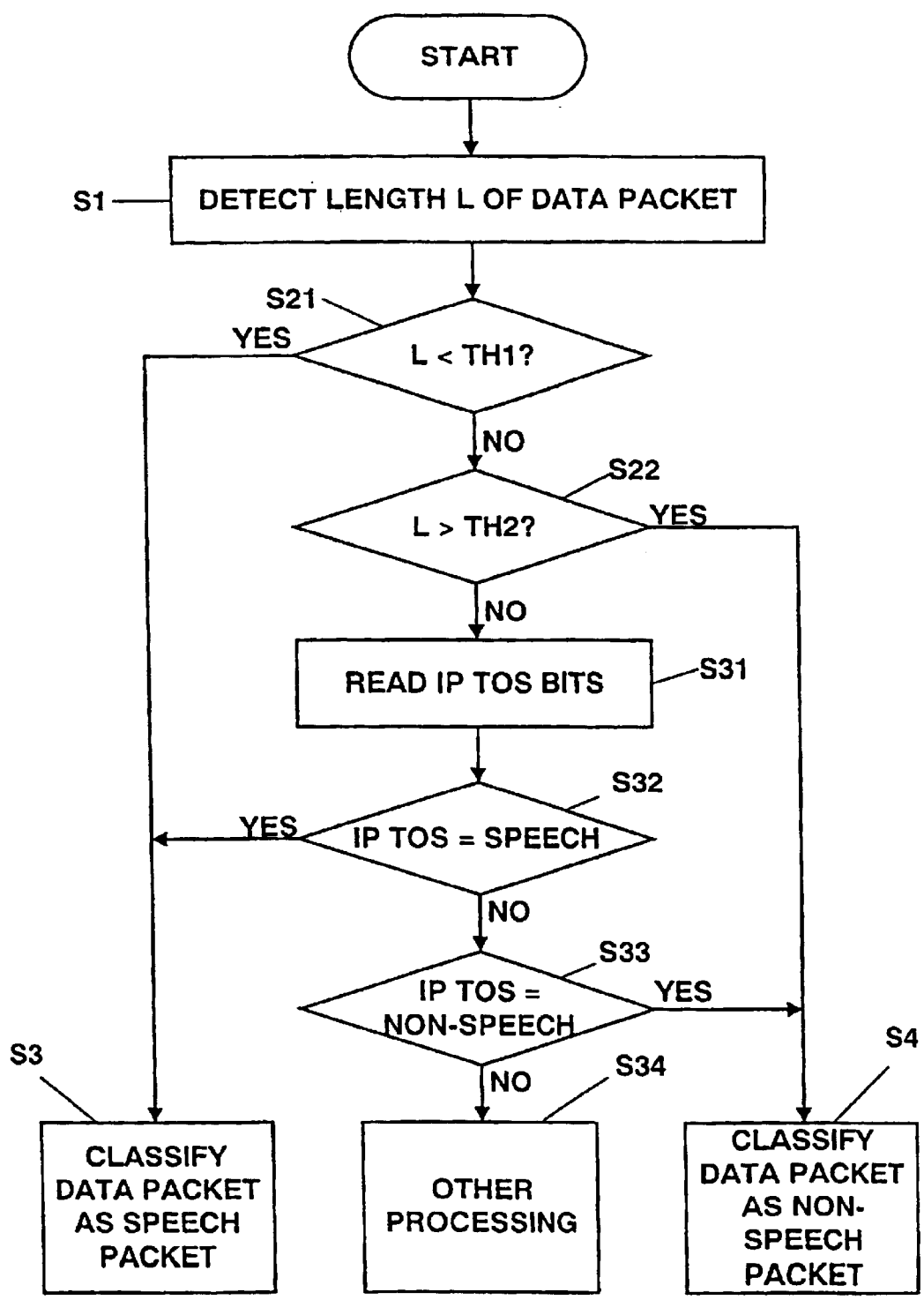
FIG. 5 shows a flowchart of a method carried out by a router of a packet network according to a third embodiment.

The process carried out in the respective routers of the network NW is shown in FIG. 5. As in the process according to the second embodiment shown in FIG. 4, there are two thresholds TH1 and TH2. As above, a packet the length L of which is shorter than the lower threshold TH1 is classified as being a speech packet (steps S21 and S3). A packet the length L of which is longer than the upper threshold TH2 is determined as being a non-speech packet (steps S22 and S4).

A packet the length L of which is between the lower threshold TH1 and the upper threshold TH2 cannot be clearly distinguished. Therefore, in this case the packets are searched for the control data field comprising the IP TOS bits. From the IP TOS bits, a corresponding value is read out in order to classify the packet unambiguously (step S31). That is, if the IP TOS bits indicate that the respective packet requires a real-time processing, this packet is classified as a speech packet (steps S32 and S3). On the other hand, if the IP TOS bits indicate that the respective packet do not require a real-time processing, this packet is classified as a non-speech packet (steps S33 and S4). In case the IP TOS bits indicate that the packet requires some other kind of service, this can be taken into account (step S34).

Thus, the third embodiment combines the present invention with the Differentiated Services as described in the introductory part. Although the edge router function are required in some cases, the processing load for classifying the packets can be reduced.

In the above embodiments, basically two different classes of packets were distinguished, namely speech and non-speech packets. However, it is to be understood that a plurality of classes can be defined. In general, a relationship between the length of a packet and the respective class of this packet can be described as follows:

$$L_i \min \leq \operatorname{len}(p) < L_i \max \Leftrightarrow p \in C_i,$$

wherein p is a packet, len(p) is the length of this packet, $L_i$min is the minimum length (or lower threshold) of a packet belonging to class $C_i$ and $L_i$ max is the maximum length (or upper threshold) of the class $C_i$. With respect to the second embodiment illustrated in FIG. 4, those packets which can not be clearly classified are allocated to an intermediate class. Hence, when taking this intermediate class as an own class, the above equation could be mapped in a table as shown below:

| i | class | $L_i$min | $L_i$max |
|---|---|---|---|
| 1 | $C_1$ = speech | 0 | TH1 |
| 2 | $C_2$ = intermediate | TH1 | TH2 |
| 3 | $C_3$ = non-speech | TH2 | ∞ (infinity) |

As an alternative of the third embodiment, it is also possible to generally combine the length classification with the classification according to Differentiated Services (in the following referred to as DS classification). That is, the steps S31 to S34 could be performed for every length classification. Thus, the packets are roughly classified by their length, and then the classification is further refined by using the DS field.

As a further alternative, it is also possible to perform the two classifications vice versa. That is, a packet is firstly classified by using the DS field thereof. Then, the classification is further refined by using the length of the packet.

Furthermore, it is to be understood that the classes of the packets are not restricted to speech and non-speech packets. For example, a video stream requires low delay and jitter. Therefore, in case it is transmitted through a packet network, the packets of the video stream also have to be processed in real time, i.e., as fast as possible. Another examples for packets distinguishable by their length are TCP acknowledgement packets in an IP network which are usually about 40 octets. In some applications, they may also be given special handling.

Figure 6A:
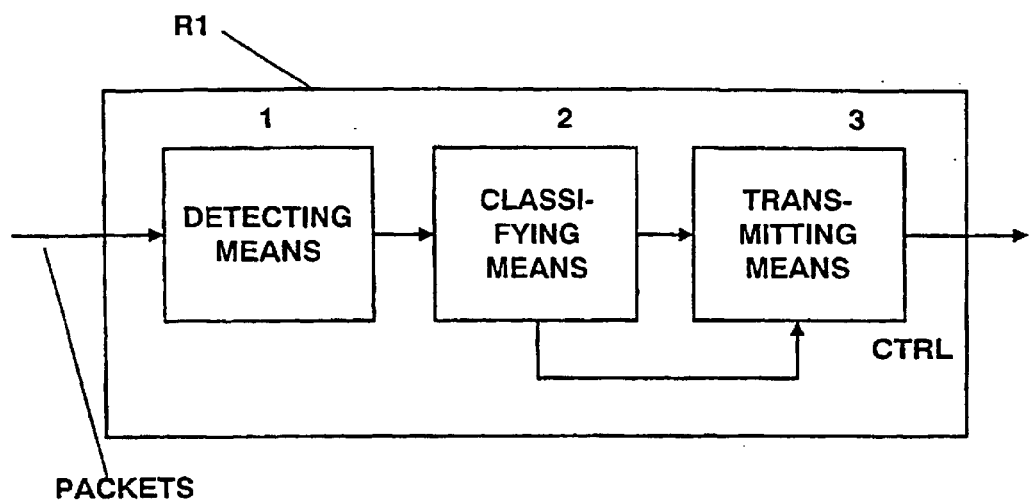
FIG. 6A shows a construction of a router for carrying out the methods according to the embodiments.

In the following, a router or routing device which is adapted to carry out the methods according to the above embodiments above is described with reference to FIG. 6A.

As an example, the construction of the router R1 shown in FIG. 2 is illustrated in more detail. The router R1 comprises a detecting means 1 which detects the length L of a packet by reading, for example. Furthermore, the router R1 comprises a classifying means 2 which classifies the packet as described above. Moreover, a transmitting means 3 is provided which transmits the respective packet. The transmitting means 3 is controlled by the classifying means 2, as indicated by the connection denoted with CTRL. In detail, in response to the classification of a packet, the respective packet is transmitted with high priority or with low priority, i.e. faster or slower.

Figure 6B:
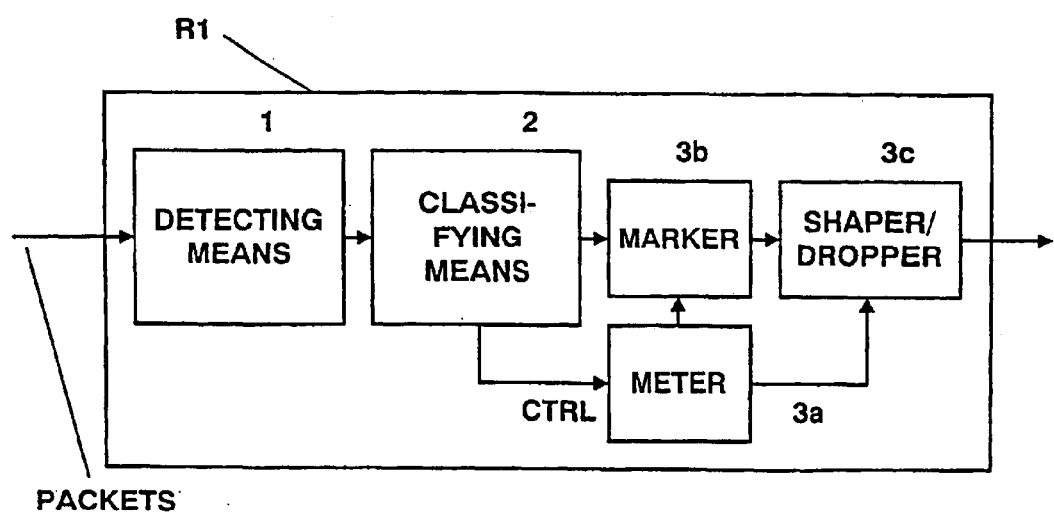
FIG. 6B shows a construction of a router in which a transmitting means is shown in more detail.

The transmitting means are shown in more detail in FIG. 6B. The transmitting means 3 according to this example comprise a meter 3a which measures the temporal properties of the stream of packets which are selected by the classifying means. Furthermore, a marker 3b is provided. The marker 3b serves to set the DS field (if present) according to the classifying result of the classifying means 2. That is, it is possible to change the classification set in the DS field if this is necessary due to the temporal properties of the packet stream. Moreover, a shaper/dropper 3c is provided. The shaper serves to delay some or all packets in the packet stream in order to bring the stream into compliance with a traffic profile. The dropper serves to discard some or all of the packets in a traffic stream in order to bring the stream into compliance with a traffic profile. This process is known as "policing" the stream.

It is to be noted that the transmitting means 3 does not necessarily need to have all the elements 3a to 3b. For example, in case the DS field is omitted in the packets, as according to the first and second embodiment, only the shaper/dropper as the transmitting means are used. However, the whole configuration of FIG. 6B is preferably used in edge routers, if present. That is, this configuration can be used in case the third embodiment is employed, for example.

The above description and accompanying drawings only illustrate the present invention by way of example. Thus, the embodiments of the invention may vary within the scope of the attached claims.

What is claimed is:

1. A method for classifying packets in a packet network (NW), comprising the steps of:
   detecting (S1) the length (L) of a packet, and
   classifying (S2, S3, S4) the packets depending on the detected length (L), wherein
   said classifying step (S2, S3, S4) further comprises a first comparing step (S21) for comparing said length (L) with a first predetermined threshold (TH1), wherein
   said classifying step further comprises a second comparing step (S22) for comparing said length (L) with a second predetermined threshold (TH2), said first threshold (TH1) being lower than said second threshold (TH2), wherein
   a packet the length (L) of which is below said first threshold (TH1) is classified as a first type of packets (S3) and a packet the length (L) of which is above said second threshold (TH2) is classified as a second type of packets (S4), and
   a packet the length (L) of which is between said first threshold (TH1) and said second threshold (TH2) is classified (S32, S33) by referring (S31) to an identifier arranged in the packet.

2. The method according to claim 1, wherein
   said first type packet is a packet requiring a real-time processing and said second type packet is a packet not requiring a real-time processing.

3. The method according to claim 1, wherein further comprising
   a step of transmitting packets through the network (NW), wherein the transmitting of a respective packet is controlled in response to the classifying of said respective packet in said classifying step.

4. A routing device for forwarding packets in a packet network (NW), comprising:
   a detecting means (1) for detecting the length (L) of a packet, and
   a classifying means (2) for classifying said packet depending on the detected length (L), wherein
   said classifying means (2) comprise first comparing means (S21) for comparing said length (L) with a first predetermined threshold (TH1) wherein
   said classifying means (2) comprises a second comparing means (S22) for comparing said length (L) with a second predetermined threshold (TH2), said first threshold (TH1) being lower than said second threshold (TH2), wherein
   said classifying means (2) classifies a packet the length (L) of which is below said first threshold (TH1) as a first type packet (S3) and a packet the length (L) of which is above said second threshold (TH2) as a second type packet (S4), and
   said classifying means (2) comprises a means (S32, S33) for classifying a packet the length (L) of which is between said first threshold (TH1) and said second threshold (TH2) by using an identifier arranged in the packet.

5. The routing device according to claim 4, wherein
   said first type packet is a packet requiring a real-time processing and said second type packet is a packet not requiring a real-time processing.

6. The routing device according to claim 4 wherein further comprising
   a transmitting means (3) for transmitting packets through said network (NW), wherein the transmitting of a respective packet is controlled in response to the classifying of said respective packet by said classifying means (2).

7. The routing device according to claim 6, wherein
   said transmitting means (3) comprises a meter (3a) for measuring temporal properties of a packet stream in response to the classifying by said classifying means (2).

8. The routing device according to claim 6, wherein
   said transmitting means (3) comprises a marker (3b) for setting a control data field of said respective packet in response to the classifying by said classifying means (2).

9. The routing device according to claim 7, wherein said transmitting means (3) comprises a marker (3b) for setting a control data field of said respective packet in response to the classifying by said classifying means (2) and in response to the measuring of said meter (3a).

10. The routing device according to claim 6, wherein said transmitting means (3) comprises a shaper (3c) for shaping said data stream in response to the classifying by said classifying means (2).

11. The routing device according to claim 7, wherein said transmitting means (3) comprises a shaper (3c) for shaping said data stream in response to the classifying by said classifying means (2) and in response to the measuring of said meter (3a).

* * * * *